June 19, 1962  C. H. WILSON  3,039,466
DIAPER PANTY
Filed Jan. 23, 1959  6 Sheets-Sheet 1
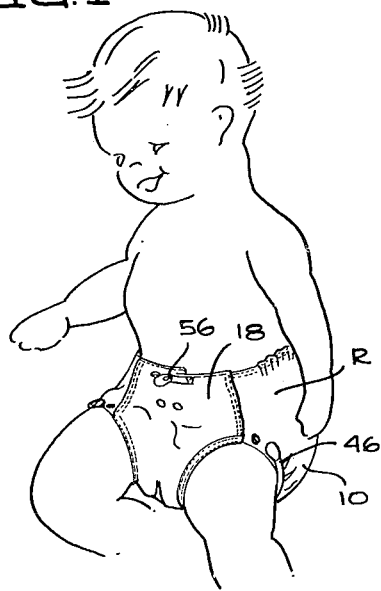
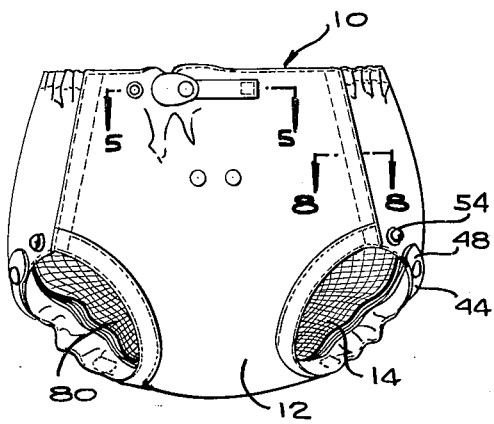
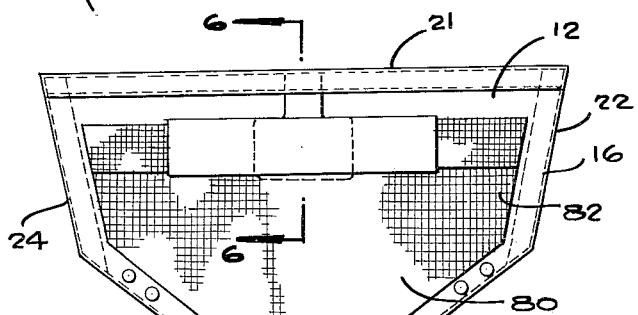
INVENTOR.
CHARLES H. WILSON

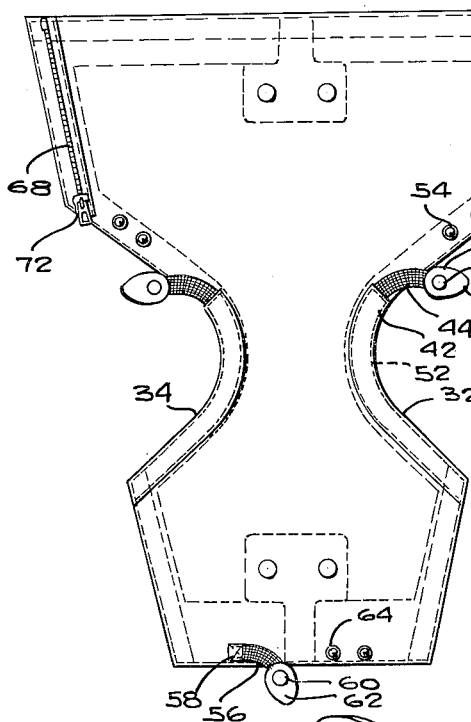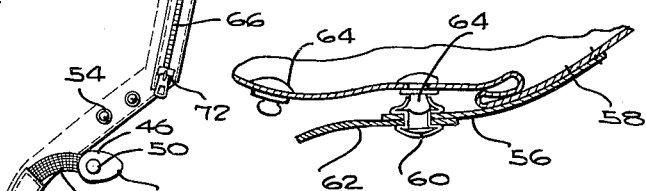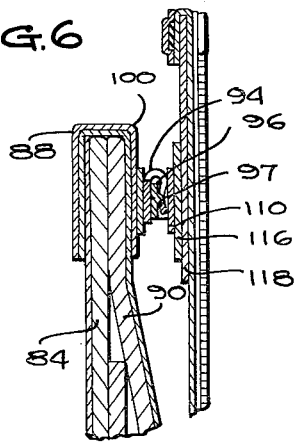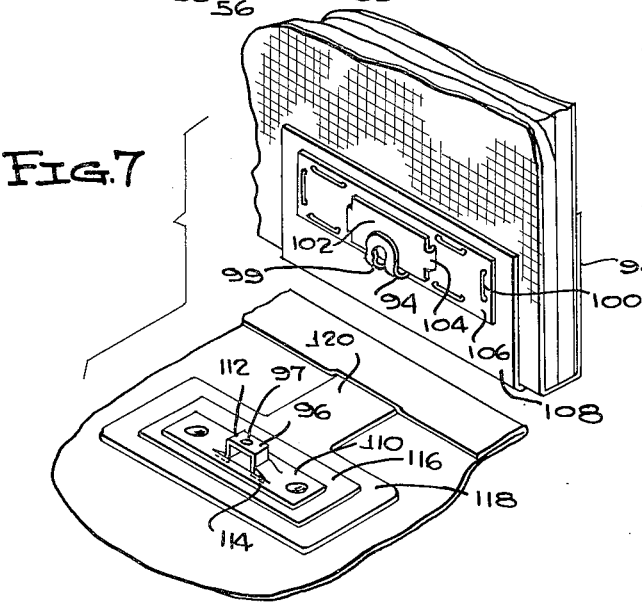

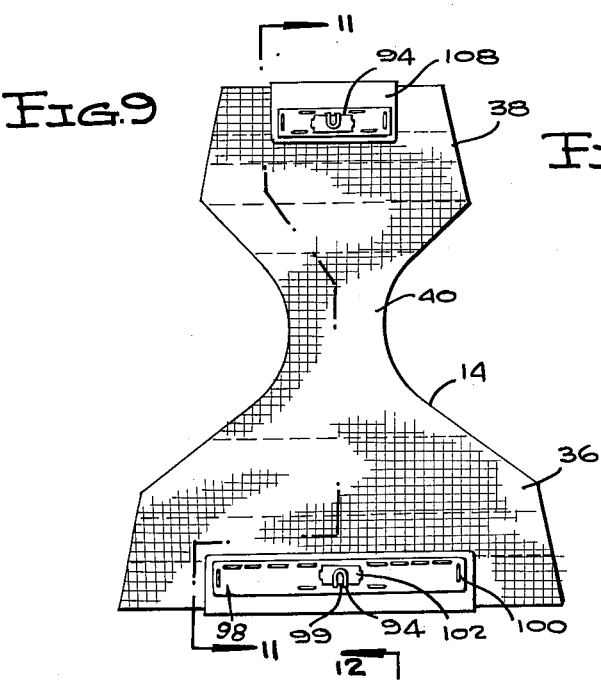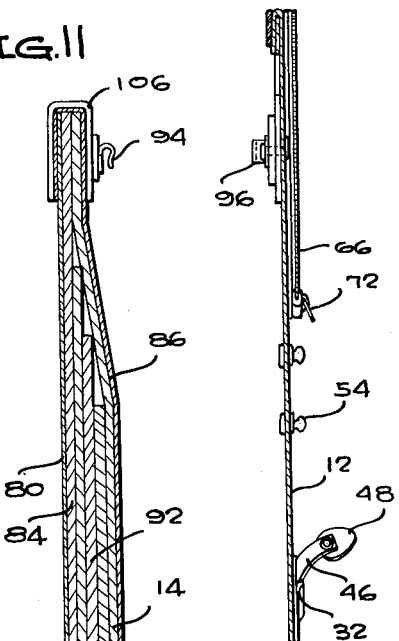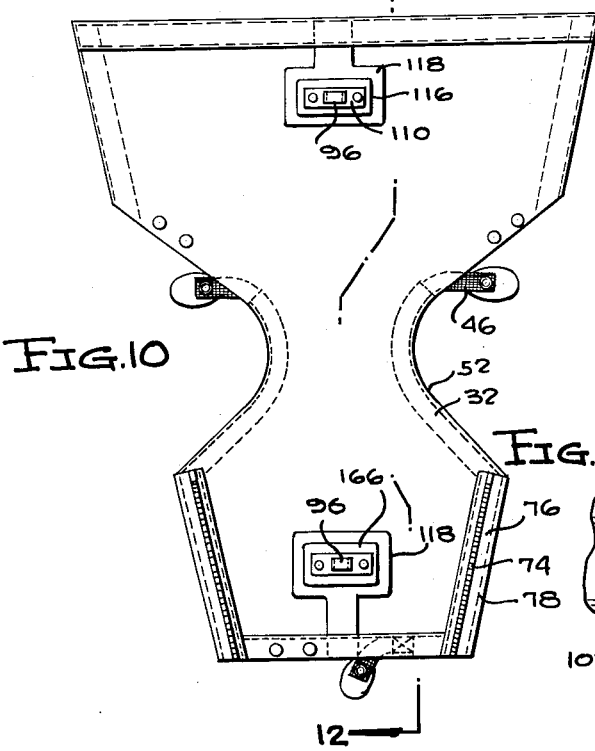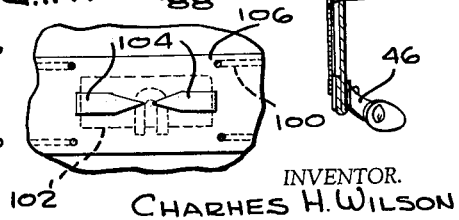

June 19, 1962 C. H. WILSON 3,039,466
DIAPER PANTY
Filed Jan. 23, 1959 6 Sheets-Sheet 4

INVENTOR.
CHARLES H. WILSON
BY
McMorrow, Berman & Davidson
ATTORNEYS

June 19, 1962  C. H. WILSON  3,039,466
DIAPER PANTY
Filed Jan. 23, 1959  6 Sheets-Sheet 5
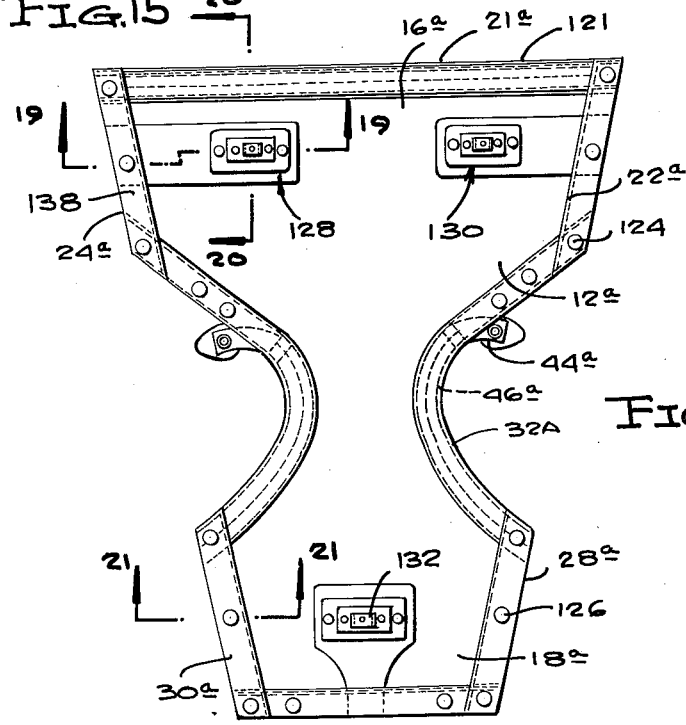
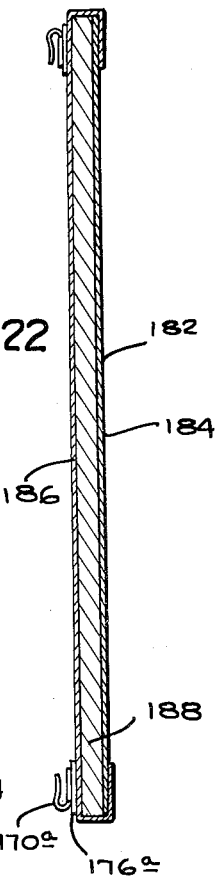
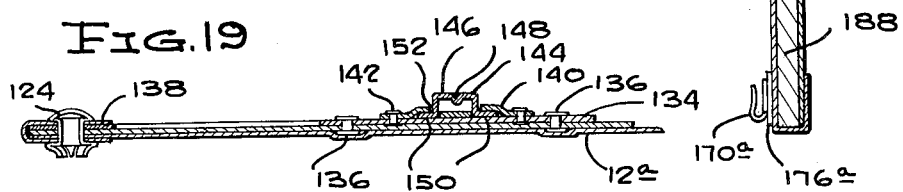
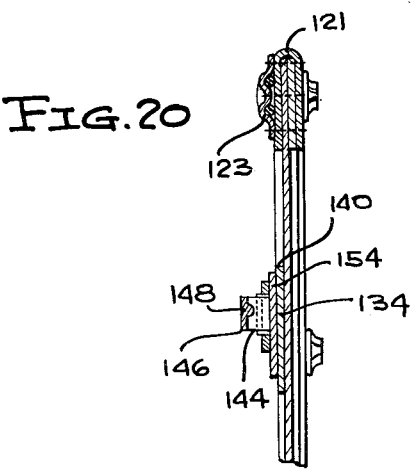
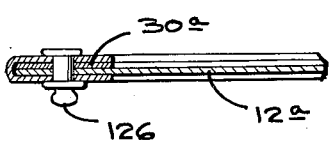
INVENTOR.
CHARLES H. WILSON
BY
McMorrow, Berman + Davidson
ATTORNEYS June 19, 1962 C. H. WILSON 3,039,466
DIAPER PANTY
Filed Jan. 23, 1959 6 Sheets-Sheet 6
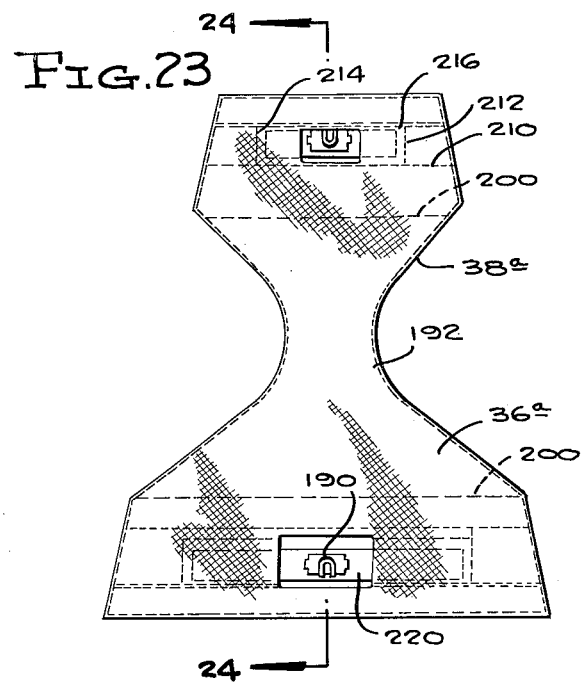
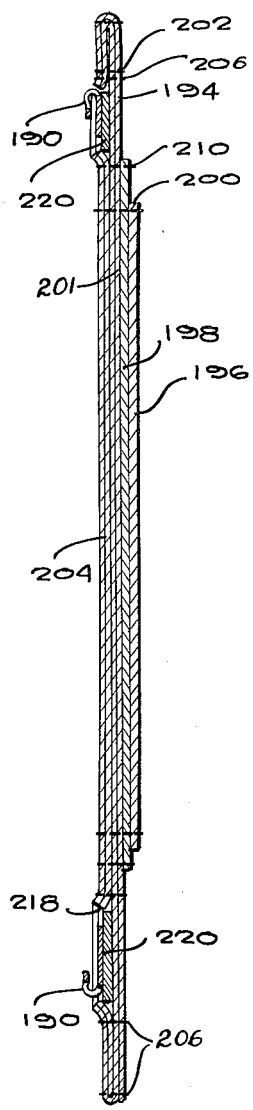
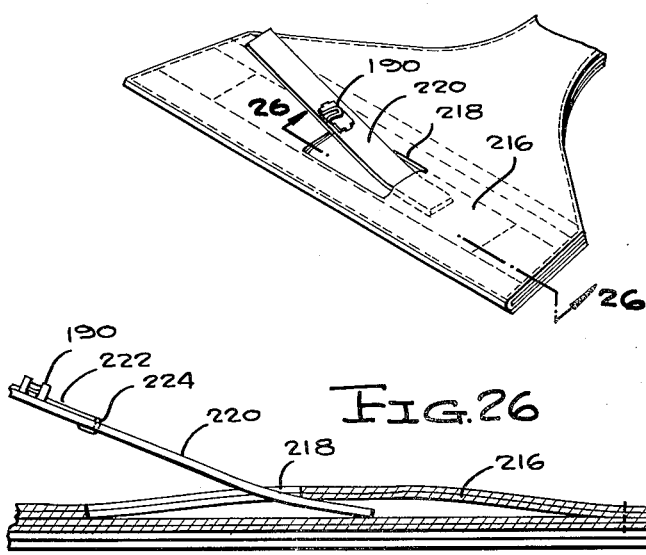
INVENTOR.
CHARLES H. WILSON
BY
McMorrow, Berman + Davidson
ATTORNEYS

United States Patent Office 3,039,466
Patented June 19, 1962

3,039,466
DIAPER PANTY
Charles H. Wilson, 742 Harrison St., Paducah, Ky.
Filed Jan. 23, 1959, Ser. No. 788,585
5 Claims. (Cl. 128—287)

The present invention generally appertains to a diaper structure and, in particular, relates to a novel and improved diaper panty structure, which is composed of a diaper cover member and a diaper insert or liner, that is preferably of a disposable nature.

A primary object of the present invention is to provide an improved diaper panty, which includes a cover member, which is shaped and formed in a manner to fit comfortably on a child's body and which is simply constructed so as to be devoid of any parts, which would interfere with the comfort of the infant, and which is provided with novelly constructed closure means for securing it in place on the infant's body.

Another important object of the present invention is to provide a disposable liner or insert, which is attached to the inside surface of the cover member in a novel and simple manner, permitting easy and quick attachment and detachment to and from the cover member and which is preferably formed so as to be disposable.

Another important object of the present invention is to provide a disposable insert or liner, which is constructed in a multi-ply fashion, the various plys consisting of absorbent material, such as paper, synthetic sterile material, such as cotton fibers and cover sheets, such as hard paper or plastic, which would be extremely thin and flexible.

Another important object of the present invention is to provide a disposable liner, which consists of an inner cover sheet in the form of a synthetic cotton, rayon or nylon screen, such sheet being disposed next to the body of the infant and being formed in a manner so as to not chafe or in any way injure the body of the infant, regardless of whether the sheet is in a clean or soiled condition.

A further important object of the present invention is to provide simply and compactly constructed catches, which are in the form of a hook and keeper member, such catches being secured to the juxtaposed surfaces of the cover member and the liner and providing the means for attaching the liner to the inside of the cover member.

A further important object of the present invention is to mount such catches in a manner so as to be removable, thereby permitting the liners to be inexpensively constructed for disposal purposes and also permitting the use of non-disposable liners, with the catches being removable for the purpose of washing the liners.

The foregoing and ancillary objects, including the provision of an inexpensive, simply constructed, comfortably worn and adjustable diaper structure, are attained by this invention, the preferred embodiments of which are set forth in the following description and illustrated in the accompanying drawings, wherein:

FIGURE 1 is a perspective view of one form of diaper structure, in accordance with the present invention, and showing the same applied to an infant;

FIGURE 2 is a front elevational view of the diaper structure in a closed position, which it would assume on the infant's body;

FIGURE 3 is a plan view of the diaper structure looking at the inside thereof;

FIGURE 4 is a plan view of the diaper structure, looking at the outside thereof;

FIGURE 5 is a detail, cross-sectional view, taken on line 5—5 of FIGURE 2 and illustrates the adjustment feature for the waist;

FIGURE 6 is a detail, longitudinal sectional view, taken on line 6—6 of FIGURE 3 and illustrates the catch means for attaching the liner to the cover member;

FIGURE 7 is a detail, fragmentary perspective view of the catch means;

FIGURE 8 is a detail, cross-sectional view, taken on line 8—8 of FIGURE 2, and illustrating the adjustment means for the leg portions of the diaper panty;

FIGURE 9 is a plan view of the liner, looking at the outside thereof;

FIGURE 10 is a plan view of the cover member, looking at the inside thereof, with the liner removed;

FIGURE 11 is a longitudinal sectional view taken on line 11—11 of FIGURE 9 and showing the multi-ply construction of the liner;

FIGURE 11a is a detail sectional view taken on line 11a—11a of FIGURE 11;

FIGURE 12 is a longitudinal sectional view taken on line 12—12 of FIGURE 10 and illustrating the construction of the cover;

FIGURE 15 is a plan view of the cover member of FIGURE 13, looking at the inside thereof and with the liner removed;

FIGURE 19 is a detail, cross-sectional view taken on line 19—19 of FIGURE 15;

FIGURE 20 is a detail, longitudinal sectional view taken on line 20—20 of FIGURE 15;

FIGURE 21 is a detail, cross-sectional view taken on line 21—21 of FIGURE 15;

FIGURE 22 is a longitudinal sectional view of a modified form of liner;

FIGURE 23 is a plan view of a further modified form of liner, looking at the outside thereof;

FIGURE 24 is a longitudinal sectional view taken on line 24—24 of FIGURE 3;

FIGURE 25 is a fragmentary perspective view of one end of the liner of FIGURE 23, showing the manner in which the catches are removably secured to the ends of the liner; and, FIGURE 26 is a detail, cross-sectional view, taken on line 26—26 of FIGURE 25.

Figure 13:
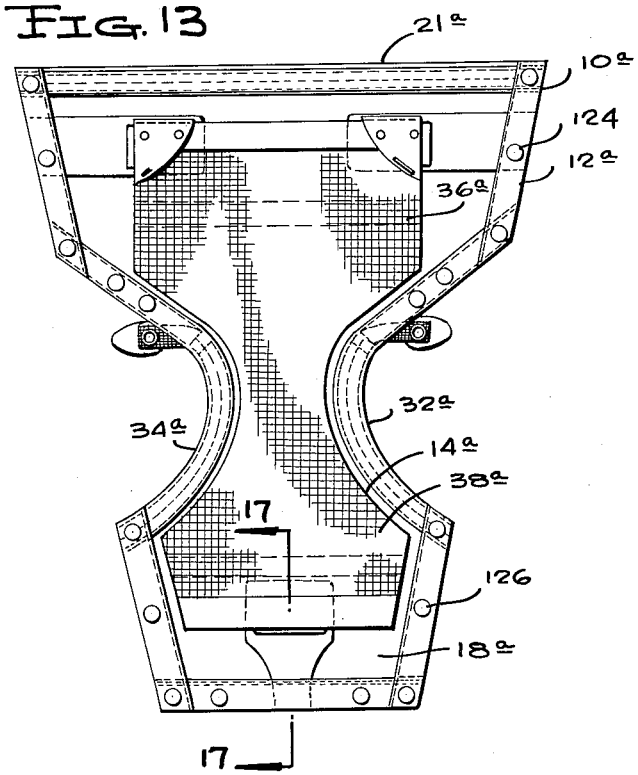
FIGURE 13 is a plan view of a modified form of diaper panty or diaper structure, in accordance with the principles of the present invention, looking at the inside thereof, with the liner in place.

Referring now more particularly to the accompanying drawings and initially to FIGURES 1–12, the diaper structure 10 is of the panty type and includes a cover member 12 and a liner 14. The cover member and the liner have the same general shape, with the liner being of smaller dimensions than the cover member.

As shown in FIGURE 3, the cover member 12 is of one-piece construction and includes a trapezoidal shaped back or rear section 16 and a trapezoidal front section 18, such sections being connected by a crotch piece 20, which is of substantially hyperbolical shape.

More particularly, the back section 16 includes a top edge portion 21, which is straight, and side edge portions 22 and 24, which converge inwardly, relative to the integrally associated crotch section 20. The front section 18 is much shorter in width but substantially the same length and includes a straight top edge portion 26 and straight side edge portions 28 and 30 which diverge outwardly relative to the integrally associated crotch section 20.

The crotch section is formed with arcuate or concave side edges 32 and 34 and is integrally connected with the bottom edge portions of the back and front sections.

The edge portions of the front and back sections and the concave edges 32 and 34 of the crotch section are reinforced with reinforcing tapes with elastic being provided within the edge portion 21.

The liner 14, as shown in FIGURE 9, for example includes a rear or back section 36, which is substantially trapezoidal in form, complemental to the form of the back section 12 of the cover member but of smaller dimensions so as to overlie the back section of the cover member, as shown in FIGURE 3. Similarly, the front section 38 of the liner is of substantially trapezoidal form, complemental to the front section 18 of the cover member and adapted to overlie the inner surface of the front section, as shown in FIGURE 3. The integrally associated and connecting crotch section 40 of the liner is of generally hyperbolical form, complemental to the form of the crotch section 20 of the cover member, as shown in FIGURE 3.

It is intended that the diaper panty 10 be adjustable in construction so that it can be applied to the infant through quite a period of normal growth. Thus, a simply constructed and easily operated, but extremely effective and reliable, adjustment means is provided for the leg portions and the waist portion of the diaper panty.

As shown particularly in FIGURE 4, the outside surfaces of the edge portions 32 and 34 are constructed in the form of tubular housings 42, within which the elastic shank portions 44 of adjustment straps 46 are inserted. The adjustment straps are formed with outer, enlarged ends 48, on the inner surfaces of which the female parts 50 of a snap fastener assembly are provided. The elastic shank portions 44 are socketed in the tubular housings 42 and secured therein by stitching 52. On the outer surface of the edge portions 32 and 34 a plurality of the male parts 54 of the snap fastener assembly are provided. The male parts 54 are disposed in a series and are spaced apart and are disposed in spaced relation to the housings 42 and arranged so as to be engaged by the female part 50. This is shown in FIGURES 1 and 2.

The waist adjustment is obtained by means of an elastic shank portion 56, which is attached at one end, as at 58, to the outer surface of the top edge portion 26 of the front section 18 and is provided with the male part 60 on the underside of a tab 62, the male part cooperating with the female parts 64 of the snap fastener assembly, such parts being disposed in spaced relation along the edge portion 26. Such adjustment means is shown in FIGURE 2, wherein the female part 60 is attached to the innermost male part 64.

Means is provided on the side edge portions 22 and 24 of the back section and on the side edge portions 28 and 30 of the front section for the purpose of securing such edge portions together, when the cover member is placed on the infant's body and the front and back sections encircle the front and back of the infant. As shown in FIGURES 3, 4 and 10, such means includes slide fasteners 66, with one track of teeth 68, that is carried by the tape 70, being fixed to the outer surfaces of the edge portions 22 and 24, as shown in FIGURE 4. The slide member 72 is provided on the track 68 and is adapted to engage the tracks of teeth 74, which are carried by the tapes 76 that are secured by stitching 78 to the inside surfaces of the side edge portions 28 and 30 of the front section 18. The slide members 72 interlock the teeth of the tracks 68 and 74 and secure the edge portions 28 and 22 together while securing the edge portions 30 and 24 together in the body encircling position of the diaper panty on the infant's body.

The cover member 12 is preferably formed from a thin sheet of flexible material, such as plastic or the like and may be formed from transparent plastic. Obviously, the outer surface thereof may be embellished with ruffles or any similar decorative material or construction and the cover member may be formed in colors or, otherwise, treated from a standpoint of appearance.

The liner 14, as shown in FIGURE 11, includes an inner sheet 80, which defines the inside surface of the liner, that is the surface which is placed in direct contact with the body of the infant. The sheet 80 is formed in a mesh screen fashion from synthetic cellulose, the threads 82 being arranged in crosswise fashion to form the sheet. As aforestated, the liner 14 is composed of a plurality of layers or plies. The layer 84, which is juxtaposed to the sheet 80, is formed from paper and is relatively thick. Preferably, it is flat and is co-extensive in width and length with the sheet 80. The outermost layer or sheet 86, which is juxtaposed to the inner surface of the cover 12, is formed from a thin flexible material and has its edge portions 88 overlying the outer edges of the layers and secured to the outer face of the sheet 80 at its edge portions. The layer 90 is formed from paper and is juxtaposed to the outermost sheet 86, while the innermost layers 92 are formed from absorbent material, such as paper or cellulose fiber tissue. The inntermost plies or layers are arranged in staggered relationship and are stepped from the innermost, inner layer 84 to the outermost layer 90. Such inwardly stepped relationship enables the body of the liner to be formed with a substantial absorbent thickness while not creating any bulkiness at the edge portions of the liner.

Means is provided for detachably securing the liner to the inner surface of the cover member, as shown in FIGURE 3.

As shown in FIGURE 7, such attachment means includes a hook member 94, which is carried by the liner and a loop-type keeper 96, which is carried by the cover member.

A reinforcing strip 98, which may be formed from plastic, paper or the like, is secured around the top edge portion of the front and back sections, as shown in FIGURE 9. As illustrated therein, the opposing side portions of the strip 98 are secured by stitching 100 to the inner and outer surfaces of the liner, at the edge portions of the front and back sections. The hooks 94 are carried by plates 102 and are formed integral with a side edge portion thereof and are bent so as to overlie the outer face of the plates. The plates are provided, as shown in FIGURE 11a, with integral arms 104, that are formed on the end edges thereof and are adapted to pierce the inner side portion of the strip 98 and to be bent behind the side portion, in the manner of staple legs, so as to fix the plate to the strip 106, which reinforces the inner side portion 108 of the strip 98 and is secured thereto by the stitching 100. Obviously, staples, cement or other suitable fastening means may be used for securing the strip 98 to the liner and the strip 106 to the inner side portion of the strip 98. The hook members 94 are disposed, so that the free ends face inwardly, when the liner is in the flat position, as shown in FIGURE 9.

The loop type keepers 96 are secured to strips 110. In this respect, the keeper members 96 include centrally disposed, channel type body portion 112, the legs of which terminate in oppositely and outwardly extending arms 114, which have pointed distal ends and which are adapted to be embedded behind the strip 110, as shown in FIGURE 7. The strip 110 is attached to a reinforcing srtip 116, which is in turn fixedly superimposed on the face of the head portion 118 of a T-shaped tab 120. The free end of the leg portion of the tab is fitted under the reinforcing tape at the top edge portions of the front and back sections of the cover member and secured by the stitching.

It can be seen that the hook members 94 are easily fitted into the keeper members 96 and that the liner is thus securely fastened to the inner surface of the cover member. The liner may be easily detached by merely sliding the hook members out from the keeper members. In this respect, locking protuberances 97 are formed on the underside of the webs of the body portions 112 and fit in the central longitudinal slots 99 formed in the hook members.

In the modified form, as shown in FIGURES 13-21, the cover member 12a is similar in shape and form to the cover member 12 and is provided with reinforced edges. The top edge 21a is provided with an elastic strip reinforcing tape 121 which overlies the edge and encloses the elastic tapes 123. The side edges 32a and 34a are provided with the housings enclosing the elastic shanks 44a of the adjustment straps 46a, the straps being formed and used in the same manner as the straps 44.

In place of the slide fastener assembly, which is utilized as the connecting means between the complementary side edge portions of the front and back sections of the cover member 12, as shown in FIGURE 4, the cover member 12a of the diaper structure 10a is provided with snap fasteners. Thus, the inner surfaces of the edge portions 22a and 24a are provided with snap fasteners 124, which cooperate with companion snap fasteners 126 on the outer surface of the side edge portions 28a and 30a of the front section 18a.

The liner 14a is similar in form and shape to the liner 14 and is removably fastened to the inner surface of the cover member 12a by means of catches, as will be described.

As shown in FIGURE 15, the back section 16a of the cover member 12a is provided with a pair of keeper element assemblies 128 and 130, which are identically constructed, and which are arranged adjacent the outer corners of the back section. A similar keeper assembly 132 is provided on the front section 18a and is disposed so as to be intermediate of the keeper assemblies 128 and 130 on a line, along the long axis of the cover member. As can be seen from the plan view of FIGURE 15, the keeper assemblies are arranged in a triangular pattern, with the keeper assembly 132 being arranged at the apex of the triangular pattern and the keeper assemblies 128 and 130 being arranged at the corners of the base end of the triangular pattern.

With particular regard to FIGURES 19 and 20, for the showing of the construction and mounting of the keeper assembly 128 (with the keeper assembly 130 being identically formed and mounted), it can be seen that the one-ply cover member 12a has a strip 134, which is formed of suitable stiffer but flexible material, secured on its inner surface by rivets 136. The strip 134 extends transversely of the cover member and is arranged parallel with the top edge portion 21a thereof. The strip extends to the outer side edge 24a and is received under the reinforcing tape 138, which encloses the edge portion. This also shows the mounting of the female member 134 of the snap fastener assembly, which, as can be seen is inserted through a suitable opening and has its head and inner end crimped into place.

A mounting plate 140 is fastened to the inner surface of the reinforcing strip 136 by means of rivets 142. A loop-type keeper element 144 is formed with a channel-shaped body portion 146 having the underside of its web crimped to provide a locking enlargement 148. The legs of the channel-shaped body portion terminate in outwardly directed legs 150 which are fitted into slits 152 formed in the plate so as to secure the keeper elements in place.

Preferably, a rigidifying plate 154 is interposed between the strip 134 and the plate 150.

Figure 17:
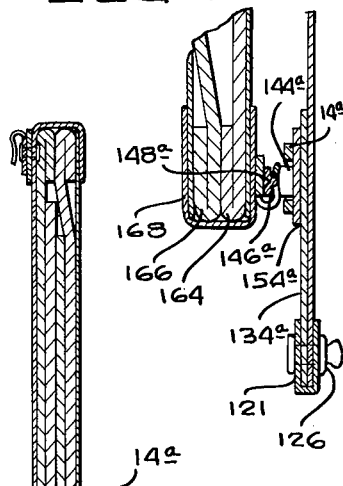
FIGURE 17 is a detail, longitudinal sectional view taken on line 17—17 of FIGURE 13 and illustrating the catch means for securing the liner to the cover member.

As shown in FIGURE 17, the keeper assembly 132 is very similar in construction and mounting to the keeper assemblies 128 and 130 and, thus, a reinforcing strip 134a is attached to the inner surface of the cover member and a reinforcing plate 154a is fixed thereon and receives the supporting plate 140a, to which the keeper element 144a is secured, with the web portion 146a thereof having the locking protuberance 148a. As shown in FIGURE 17, the male members 126 of the snap fastener locking assembly are secured through suitable openings formed in the end portion and through the strip 134a, with the strip and end portion being held together by the reinforcing tape 121.

A snap type adjustment means is provided for adjusting the top edge portion of the front section 18a of the cover. This is shown in FIGURE 13.

Figure 14:
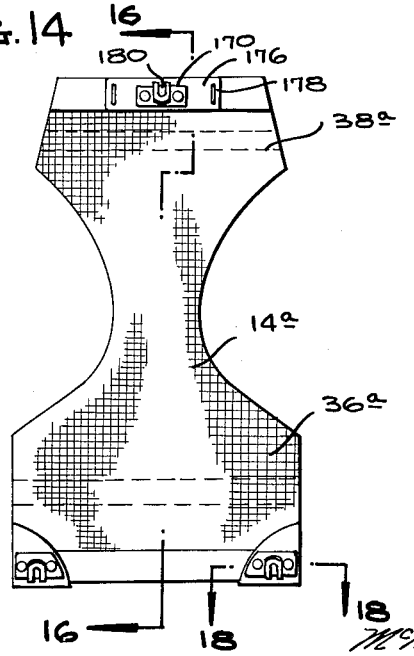
FIGURE 14 is a plan view of the liner of FIGURE 13, looking at the outside thereof.
Figure 16:
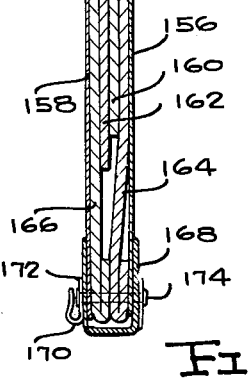
FIGURE 16 is a longitudinal sectional view, taken on line 16—16 of FIGURE 14.
Figure 18:
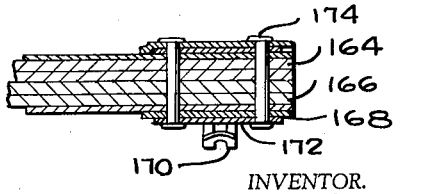
FIGURE 18 is a detail, cross-sectional view taken on line 18—18 of FIGURE 14 and illustrating a part of the catch means, which is secured to the liner.

As shown in FIGURES 14 and 16, the liner 14a is similar in shape but of smaller dimension than the cover member and overlies the back section or inner surface of the cover member, shown in FIGURE 13. The front section 38a of the liner member is similar to the front section of the cover member while the back section 36a is similar to the back section 16a of the cover member.

The liner 14a, as shown in FIGURE 16, includes inner and outer layers or covering sheets 156 and 158, which are preferably formed from synthetic mesh-like screen material, such as cotton, rayon or nylon. The innermost layers 160 and 162, which are disposed substantially at the center of the liner so as to reduce the width or thickness thereof at the edge portions, are preferably formed of sterile, natural or synthetic, absorbent material, such as absorbent cotton or paper. The layers 164 and 166, which enclose the innermost layers and which lie immediately adjacent to the outer sheets 156 and 158 are preferably formed of paper and have their outer edges reverted and enclosed by a reinforcing tape 168, which may be stitched, stapled, cemented or otherwise secured thereto.

Hook members 170 are carried by mounting plates 172, which are fixed by rivets 174 to the rear or back side of the liner, at the corners of the rear section 36a and at the center of the top edge portion of the front section 38a, as shown in FIGURE 14. The hook member 170, which is provided at the top edge of the front section 38a, has its plate fastened to a reinforcing strip 176, which is secured by staples 178 to the reinforcing tape at the edge portion.

It will be noted that the hook members are provided with the slots 180, that slide on the projections of the lip-type keepers, with the hook members fitting under the webs of the body portions of the keeper members.

A modified form of liner is shown in FIGURE 22, wherein the liner 182 includes inner and outer screen-type sheets 184 and 186, which are similar in structure and design to the sheets 156 and 158 of the liner 14a. The edges of the sheet 186 are extended over and overlie the edges of the sheet 184 and are suitably secured thereto, with the sheets having a single absorbent inner layer 188, which is of constant thickness and is formed in an integral manner of a single material. The reinforcing strips 176a support the hook members 170a, with the construction and operation being identical to that of the form shown in FIGURE 13.

A modified form of liner construction is shown in FIGURES 23 to 26. In such form, the liner is intended to be of a non-disposable nature and is intended to be washed and then reused. However, it is also intended that the liner may be of a disposable nature but the hook members 190 are mounted on the liner so as to be removable therefrom. This permits the formation and sale of liners with only a single set of hook members, which may be removed from a soiled liner and then attached to a replacement liner. Thus, the liners may be of the disposable or non-disposable type but, in either instance, it is intended that the hook members 190 are so attached to the liner as to be removable therefrom. The liner 192, as shown in FIGURES 23-26 is, for the purpose of illustration, shown as a non-disposable type, which is provided for institutional or rest-home use.

The planar shape of the liner 192 is the same as the liners 14 and 14a and, of course, has the back section 36a and the front section 38a. The liner is made up of a number of layers, which are stitched or stapled together. Thus, as shown in FIGURE 24, the multiple layer liner 192 includes an outer cover sheet 194 which has filler sheets 196 and 198 superimposed thereon and secured thereto by the stitching 200, the filler sheets being disposed at the crotch area of the liner and being superimposed on the outer surface of the sheet 194 so as to be in contact with the body of the infant. The cover sheet encloses an inner sheet 201 and the sheets are stitched together, along their side edges and have their end edges, that is the top edges of the front and back sections, folded over and stitched together by stitching 202. A two-layer cover sheet 204 has its edges secured by stitching 206 and forms the surface of the liner which is in contact with the cover member.

The multi-layer or multi-ply sheet 204 is also fixed by transverse stitching 210 and by longitudinal stitching 212 and 214 so as to define a pocket 216 at each end of the liner. The pocket 216, as shown in detail in FIGURES 25 and 26, is formed with a cutout 218 and is adapted to receive a stiffening strip 220, which is formed of relatively stiff plastic or the like material. A plate 222 is formed with staple-type legs 224, which are inserted through openings in the stiffening plate and the plate 22 is fixedly superimposed thereon to support the hook members 190. Thus, the hook members are removable from the liner by merely sliding the ends of the strip 220 out from the ends of the pocket, this operation being easily accomplished by buckling the strip 220 upwardly and withdrawing one end and then slipping the other end through the cutout 218, shown in FIGURE 26. In this fashion, the hook members 120 may be removed and the liner may then be washed or, if it is of a disposable nature, may be disposed of. A replacement liner may have the hook members 190 easily attached thereto. Obviously, it is intended that the hook members 190 may be replaceable in a construction, of the type shown in FIGURE 13, wherein the corners of the back section 36a are provided with the hook members and the center of the top edge of the front section is provided with a single hook member.

It is to be particularly noted that the slide fastener and the hook members of any of the forms of the present invention may be formed from suitable material, it being intended that rubber or soft plastic will be used. Also, it is to be understood that the materials, from which the cover member and the liner are formed, as herein disclosed, are the desired and preferred materials. In this respect, other forms of the invention may be realized and, therefore, limitation is sought only in accordance with the appended claims.

What is claimed is:

1. An infant's diaper comprising a one-piece cover member having a trapezoidal-shaped back section, a smaller trapezoidal front section and a connecting crotch section of hyperbolical shape, said cover member having inner and outer surfaces, a liner of multi-ply absorbent material and having a general shape as and of smaller dimensions than the cover member, said liner having an inner and outer surface, said liner being superimposed on the cover member with the outer surface of said liner engaging the inner surface of said cover member, and cooperating fasteners carried by the juxtaposed inner and outer surfaces of the cover member and the liner, said crotch section having concave side edge portions of a tubular cross section, said edge portions defining leg holes, elastic shanks fitted in the edge portions and having outer enlarged ends and cooperating fastening means on the enlarged ends and the adjoining portion of the side edge portions for adjustment of the leg holes.

2. An infant's diaper comprising a one-piece cover member having a trapezoidal-shaped back section, a smaller trapezoidal front section and a connecting crotch section of hyperbolical shape, said cover member having inner and outer surfaces, a liner of multi-ply absorbent material and having a general shape as and of smaller dimensions than the cover member, said liner having an inner and outer surface, said liner being superimposed at its outer surface on the inner surface of the cover member and cooperating slidably interfitting fasteners carried by the juxtaposed inner and outer surfaces of the cover member and the liner, said fasteners comprising channel-shaped keeper elements secured on the inner surface of the cover member adjacent the top edges of the front and back sections, and cooperating hook members provided on the outer surface of the liner and adapted to slide under the channel-shaped keeper elements, and said hook members being removably mounted on the liner.

3. In a diaper construction which includes a cover member and a removable liner, means securing the member and the liner in juxtaposed position with juxtaposed surfaces and including loop-type keeper elements mounted on the one surface of the cover member at the ends thereof, and hook members mounted on the juxtaposed surface of the liner and adapted to be hooked under the keeper elements, said liner having pockets and removable stiffening plates fitted in the pockets and on which the hook members are mounted.

4. In a diaper construction, a liner comprising inner and outer superposed surface sheets shaped to define back, front and crotch sections, said front and back sections having upper edges, one of the sheets having a cutout adjacent each upper edge, reinforcing strips removably fitted through the cut-outs to fit between the sheets and fastening means mounted on the strips.

5. In a diaper construction, a liner comprising inner and outer superposed surface sheets shaped to define a back, front and crotch sections, said front and back sections having upper edges, one of the sheets having a cut-out adjacent each upper edge, reinforcing strips removably fitted through the cut-outs to fit between the sheets and hook-shaped fastening elements mounted on the strips.

References Cited in the file of this patent

UNITED STATES PATENTS

| | | |
|---|---|---|
| 1,045,596 | O'Donnell et al. | Nov. 26, 1912 |
| 1,195,904 | Bornstein | Aug. 22, 1916 |
| 1,664,298 | Katz | Mar. 27, 1928 |
| 2,013,436 | Downing | Sept. 3, 1935 |
| 2,119,610 | Tasker | June 7, 1938 |
| 2,604,097 | White | July 22, 1952 |
| 2,793,642 | Andruhovici | May 28, 1957 |
| 2,890,700 | Lonberg-Holm | June 16, 1959 |

FOREIGN PATENTS

| | | |
|---|---|---|
| 258,839 | Germany | Apr. 18, 1913 |